United States Patent
Mooers

[11] Patent Number: 6,061,947
[45] Date of Patent: May 16, 2000

[54] FISHING LURE

[76] Inventor: James R Mooers, 144 Main St., P.O. Box 93, Dennisville, N.J. 11743

[21] Appl. No.: 09/336,854

[22] Filed: Jun. 21, 1999

[51] Int. Cl.[7] .................................................. A01K 85/01
[52] U.S. Cl. ........................ 43/42.06; 43/42.47; 43/42.5
[58] Field of Search .............................. 43/42.06, 42.32, 43/42.45, 42.47, 42.49, 42.5, 42, 43.1, 43.13; D22/129, 130, 131, 132, 133

[56] References Cited

U.S. PATENT DOCUMENTS

| | | |
|---|---|---|
| 861,116 | 7/1907 | Heddon . |
| 2,588,300 | 3/1952 | Smith . |
| 2,711,048 | 6/1955 | Edson . |
| 3,043,042 | 7/1962 | Mutti . |
| 3,585,749 | 6/1971 | Dieckmann ............................ 43/42.03 |
| 4,180,936 | 1/1980 | Davis ..................................... 43/42.5 |
| 4,962,609 | 10/1990 | Walker .................................. 43/42.06 |

*Primary Examiner*—Jack W. Lavinder
*Attorney, Agent, or Firm*—Michael I. Kroll

[57] ABSTRACT

The present invention discloses an apparatus for a fishing lure which can be used in various situations. The body of the lure has a lower flat portion 21 which is elongated and is paddle shaped having the larger portion of the lure 23 oriented toward the front of the lure. The flat lower portion 21 of fishing lure 10 has a top surface 44 and a bottom surface 22 having apertures 48 attached on its edges in which fishing hooks 58 of various types can be attached. The flat surface has an upright standing fin 46 attached on its upper surface 44 with the fin 46 having multiple apertures 52 on its upper edge for receiving the fishing line 20 which causes the lure 10 to travel in different angles in the water as the line is attached to the different apertures 52. The upright standing fin 46 also has a pair of lateral eye-like structures 38 on each side having multiple apertures 36 therein which eye-like structure 38 has a receptacle 56 therein for receiving a scented plug 40. The eye-like structure 38 and apertures 36 allow the scent from the scented plug 40 to be disbursed into the water 11 in order to attract nearby fish 32. The lure 10 thus has five reflective surfaces which cause a high degree of reflectivity in the water. It is also equipped with single 60, double 62 and treble 64 hooks along with jig hair 66 allowing the lure to be used in various situations.

16 Claims, 10 Drawing Sheets

FISHING LURE

BACKGROUND OF THE INVENTION

1. Field of the Invention

The present invention relates generally to fishing lures and, more specifically, to a fishing lure having five side reflectability. Manufactured from high density plastics, aluminum or fiberglass, in a variety of colors, shapes, and hook styles. Also, having a scent release system comprising a recepticle for scent material and a plurality of apertures arrayed over eye-like structures located at each distal end of said recepticle. One of said eye-like structures is attached to a rotatable flap providing access to said recepticle. Also, said lure having grommeted multi rigging or tie ports enabling an angler to tie to a rigging port that will control the desired action such as trolling, jigging, surf casting and top water. Said grommeted apertures protect the line from chaffing and protect the lure from wear. The present invention also having a plurality of grommeted hook ports.

The hook ports are located on two swim fins on the body of the lure. The location of the hook ports provides for versatile hook placement. The present invention also provides for a variety of hook types, sizes and designs such as various color bucktail teasers.

2. Description of the Prior Art

Other fishing lures have been described in the prior art. One such patent is U.S. Pat. No. 3,533,182 issued to Turbeville and Walker on Oct. 13, 1970. Another patent was issued to Jensen on Jan. 21, 1997 as U.S. Pat. No. 5,595,015. U.S. Pat. No. 5,444,935 was issued to Pahle on Aug. 29, 1995. Another U.S. Patent was issued to Davis on Nov. 21, 1989 as U.S. Pat. No. 4,881,340. Also, U.S. Pat. No. 2,266,234 was issued to Mitchell on Dec. 16, 1941. U.S. Pat. No. 1,226,891 was issued to Jay on May 22, 1917.

U.S. Pat. No. 3,533,182

Inventor: Clarence S. Turbeville and Ike J. Walker

Issued: Oct. 13, 1970

A flash lure comprising an elongated body having rotatably mounted spinners with vanes of opposite pitch on the nose and tail of the body, respectively, which cause the lure to zigzag as it is pulled through the water. A first race is positioned between the said nose and the forward spinner and a second race is positioned rearwardly of the rear spinner.

U.S. Pat. No. 5,595,015

Inventor: Roger P. Jensen

Issued: Jan. 21, 1997

A fishing line having visual and aromatic attraction to fish. A spindle carries a rotatable spinner and a cone shaped housing that is slidable on the spindle between an upper and lower position. A cavity is formed in the bottom end of the housing and the spindle extends axially down through the housing and into and through the cavity and out the cavity mouth. A restriction on the spindle determines the lower position of the housing on the spindle. A bead on the spindle is positioned in the cavity mouth with the housing in the lower position. The cavity can be filled with scented bait when the housing is slid upwardly on the spindle to move the head out of the cavity mouth. With the housing in the lower position the bead retains the bait in the cavity.

U.S. Pat. No. 5,444,935

Inventor: William E. Pahle

Issued: Aug. 29, 1995

A fishing lure of the invention has a heavier-than-water lure body with a cavity in the lure body having at least one opening through the external surface, the opening being sized to permit insertion of a bait plug therethrough and into the cavity of a particular shape having a cross-section matching the opening, consisting of a substance which dissociates into material attractive to fish upon immersion underwater, such as dried chopped fish pressed together into the shape, the cavity being a jet-stream hole extending from between two openings, one of the openings permitting influx of water to dissociate the bait plug and the other of the openings permitting outflow of water containing material dissociated from the bait plug.

U.S. Pat. No. 4,881,340

Inventor: F. Darrell Davis

Issued: Nov. 21, 1989

The present invention generally concerns a fishing lure having a hollow body comprising inner and outer tubular members with an annular space therebetween. A plurality of attachment points permit the fishing lure to be drawn through water in a variety of orientations. In addition, modular attachment elements cooperate with the basic lure to comprise a clip-on system of members which may be assembled in selected configurations, resulting in resemblance to different baits. Light variously transmitted through the outer tubular member may be reflected by an inner tubular member to enhance alluring effects. Additionally, various openings in communication with the annular space permits transmission of air bubbles and water therethrough, for further enhanced alluring effects.

U.S. Pat. No. 2,266,234

Inventor: Wilbur A. E. Mitchell

Issued: Dec. 16, 1941

Referring to the drawing, FIG. 1 comprises a lure or fish bait, consisting of three spinners. One spinner comprises nickel or copper blades or spoons mounted for revolution upon and about a shaft or longitudinal axis by being soldered to bearings loosely fitted upon shaft. The spinner has an opening or channel longitudinal thereof, of such size that its inside edges do not contact shaft, the mounting on the shaft being accomplished through the medium of bearings.

U.S. Pat. No. 1,226,891

Inventor: J. W. Jay

Issued: May 22, 1917

It will thus be seen that I have prepared an improved eye which will not only possess to a maximum degree the advantage of quick attachment and detachment without any liability of accidental detachment; but it is to be also noted that in the formation of my eye no part of the metal touches any other part, whereby there is no flattening of the line necessary to cause it to pass from one portion of the eye to the next in the operation of attachment or detachment, and consequently the line is not weakened in any way except by the ordinary friction which is an incident necessary to any form of attachment.

While these fishing lure devices may be suitable for the purposes for which they were designed, they would not be as suitable for the purpose of the present invention, as hereinafter described. While these lures may be suitable for the single purpose for which they were designed, the Aluminator fishing lure provides multi functional uses hereinafter described. It is thus desirable to provide a multi functional fishing lure whereby its unique five sided body shape, aluminability, scent system and multi port systems can provide a fisherman with a versatile lure, capable of casting, trolling, surf casting and jigging. It is still further desirable to provide said method with three variations in said lures size.

SUMMARY OF THE PRESENT INVENTION

The present invention discloses a fishing lure for attracting game fish by means of a unique five sided fishing lure, designed to imitate injured or feeding bait fish which can be used in various situations. The body of the lure has a lower flat portion which is elongated and is paddle shaped having the larger portion of the lure oriented toward the front of the lure. The flat lower portion of the fishing lure has a top surface and a bottom surface having apertures attached on its edges in which fishing hooks of various types can be attached. The flat surface has an upright standing fin attached on its upper surface with the fin having multiple apertures on its upper edge for receiving the fishing line which causes the lure to travel in different angles in the water as the line is attached to the different apertures. The upright standing fin also has a pair of lateral eye-like structures on each side having multiple apertures therein which eye-like structure has a receptacle therein for receiving a scented plug. The eye-like structure and apertures allow the scent from the scented plug to be disbursed into the water in order to attract nearby fish. The lure thus has five reflective surfaces which cause a high degree of reflectivity in the water. It is also equipped with single, double and treble hooks along with jig hair allowing the lure to be used in various situations.

A primary object of the present invention is to provide color and/or reflective patterns familiar to feeding game fish. These familiar distress patterns trigger game fish to attack the lure as they would live, natural foods.

Another object of the present invention is to provide means for using scent attractants and their release through a unique scent release system, whereas scent is slowly released thru tiny orifice openings located in the eye-like structures.

A still further object of the present invention is to provide side swim hook ports. The hook ports are protected by grommets which in return prevent chaffing of fishing line. The hook ports are located on two swim fins on the body of the lure. The location of the hook ports provides means for versatile hook placement.

A yet further object of the present invention is to provide a versatile means of rigging or tying of fishing line. The location of tile rigging holes enables an angler to lie to a rigging port that will control the desired action, such as trolling, jigging, surf casting and top water.

Another object of the present invention is to provide a multi purpose lure system that gives an angler tile ability to reverse the lure 180 degrees to act as a deep water squid jig.

Another object of the present invention is to provide the versatility of three different lure sizes. Lure body size no. 1 is a three inch lure, lure body size no. 2 is a five inch lure, lure body size no 3 is an eight inch lure.

A yet further object of the present invention is to provide a versatile hook assortment including, single hook, double hook, and tremble hooks combined with bucktail teaser hair in different colors to coincide with the type of fish targeted.

A still further object of the present invention is to provide a lure with unique swimming ability by the density, width and thickness, combined with its shape.

Another object of the present invention is to provide a protective grommet system around all tie ports. The grommets prevent the anglers fishing line from chaffing and crimping, rendering the line weak and unreliable. The grommets prevent line break-down due to line stress.

A Still further object of the present invention is to provide a multi purpose jig, troller, surf casting or top water attractant lure.

Additional objects of the present invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views.

FIG. 4 is a perspective view illustrating tile scent ability of the aluminator lure. The aluminator lure is equipped with a unique scent release system through a plurality of aperture located in the eye-like structures. The scent plug is a natural sea sponge feature, which enables the lure to be scented with different bait fish odors, which assists in attracting fish to the lure. When in use, the scent is slowly released thru tiny holes located along the base of the eye-like structures. The plugs are stored in a container for freshness and future use.

FIG. 6 is a side plan view of the present invention taken from FIG. 4 as indicated. Shown is a plurality of tie port orifices having grommets installed therein and a plurality of hook ports shown in outline. Also shown is the rotatable flap having an eye-structure attached therein. Said flap providing access to the recepticle wherein a scent plug can be placed.

FIG. 9 is a perspective view of the present invention and its multi tie ports. The location of the rigging or tie port holes enables the angler to troll, jig, or surf cast. The lure is also capable of rising to the waters surface and acting as a popper lure. It also has the ability to reverse 180 degrees to act as a deep water squid jig. All ports are protected by grommets to assure smooth and safe line action, and less wear on line and lure.

LIST OF REFERENCE NUMERALS

With regard to reference numerals used, the following numbering is used throughout the drawings.

10 aluminator lure
11 water
12 user
14 beach
16 surf
18 rod and reel
20 line
21 flat lower body
22 bottom of lure
23 enlarged portion
24 reflectivity indicator
26 treble hooks
28 jig style
30 casting style
32 fish
34 scent release system
36 apertures
38 eye-like structure
40 scent plugs
42 scentjar
44 top of lure
46 raised fin
48 hook orifice
49 hook attachment means
50 hook orifice grommets
52 ports for line
54 flap
55 attachment means
56 receptable
58 hooks
60 single hook
62 double hook
64 treble hook
66 jig hair

DESCRIPTION OF THE PREFERRED EMBODIMENT(S)

Turning now descriptively to the drawings, in which similar reference characters denote similar elements throughout the several views, FIGS. 1 through 9 illustrate the present invention being a five-sided fish lure having multiple hooks and line tying arrangements.

Figure 1:
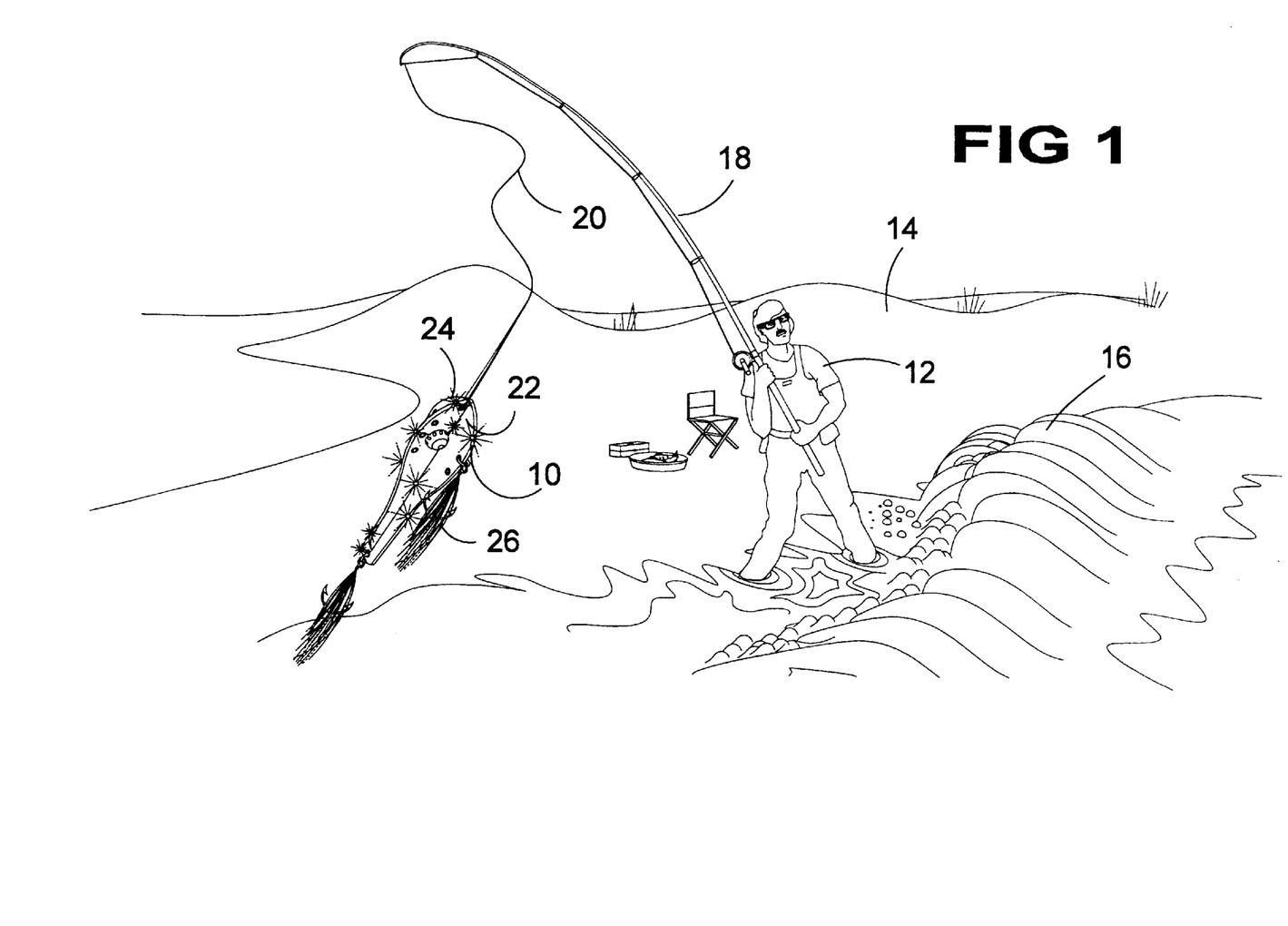
FIG. 1 is a pictorial illustration, depicting a typical surf angler using the aluminator lure. The lures unique adaptability provides a variety of uses, such as surf casting. The aluminator lure attracts game fish off the surf by its action, scent release system and color or reflective ability.

Turning to FIG. 1, therein is shown a pictorial illustration depicting a typical surf angler 12 using the aluminator lure 10. The lure's unique adaptability provides a variety of uses, such as surf casting which is shown in FIG. 1. The aluminator lure 10 attracts game fish off the surf 16 by its action, and scent release system, color and reflective ability. Also shown is the beach 14 along with the surf 16 rising thereupon. Also shown is the rod and reel 18 in the hands of the user along with the line 20 connected to the aluminator lure 10. Shown in FIG. 1 is the bottom of the lure 22 along with the reflective symbols 24 and hooks 26 being a treble hook.

Figure 2:
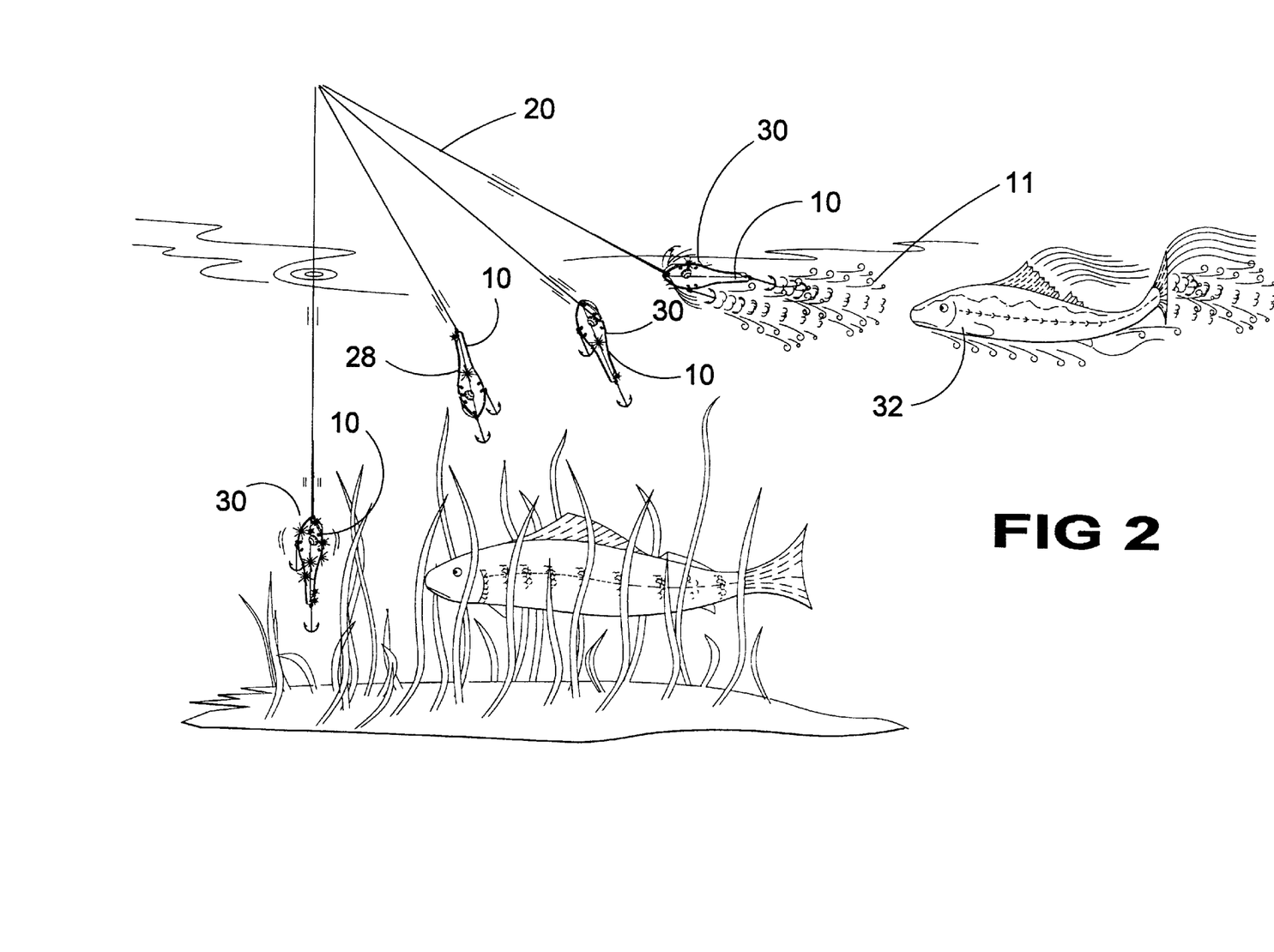
FIG. 2 illustrates the use of the aluminator fishing lure as a deep water jig and a casting or trolling lure. By varying the fishing line point of attachment to the various rigging or tying ports, enables the angler to vary the presentation of the lure according to the type of fish targeted. The aluminator lure can also be reversed 180 degrees to act as a deep water jig.

Turning to FIG. 2, therein is shown an illustration of the use of the aluminator fishing lure 10 in several different positions. It is shown as a deepwater jig 28, and as a casting and trolling lure 30 along with fish 32. Varying tile fishing line 20 point of attachment to the various rigging and tying points, enables the angler to vary the presentation of the lure in the water 11 according to the type of fish which are being targeted. The aluminator lure can also be reversed 180 degrees by tying the line on its tail and used as a deepwater jig as shown in 28.

Figure 3:
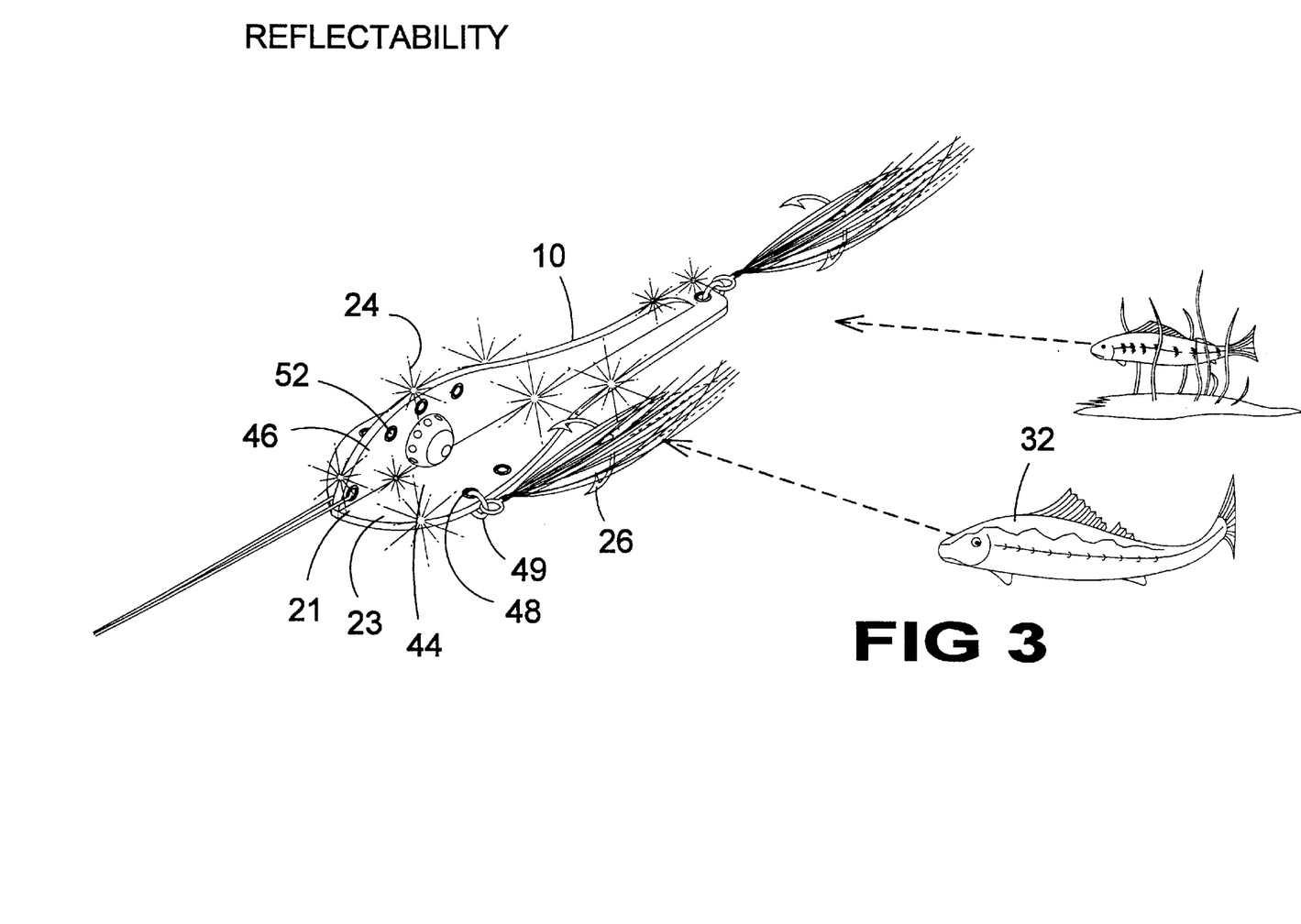
FIG. 3 is a perspective view showing the reflective ability of the live sided lure. Accompanied by its shape and swimming ability, game fish recognize it as a natural source of food and are lured to strike at it.

Turning to FIG. 3, therein is shown a perspective view showing the reflective ability 24 of the five-sided lure 10. The reflective ability 24 along with the shape and swimming ability of the lure causes game fish to recognize it as a natural source of new food being lured to it and thereafter striking at it. Also shown therein are fish 32. Shown therein is the elongated flat lower body generally shown at 21 of the lure having an enlarged broader front 23 portion narrowing toward the rear similar to a paddle. The lower flat body has a top surface 44 and a bottom surface (not shown). An upright standing fin-like member 46 is attached perpendicular and intermediate to the top surface 44 thereby forming a lure with five sides for increased reflectivity. Multiple transverse apertures 52 are also shown on the periphery of the fin 46 whereby the fishing line can be attached to the lure 10 at various positions in order to adjust the angle at which the lure travels through the water 11. Multiple transverse apertures 48 are shown on the periphery of the lower body 21 for attaching the hooks 26 by using hook attachment means 49 of the standard type as would be done by one skilled in the art.

Figure 4:
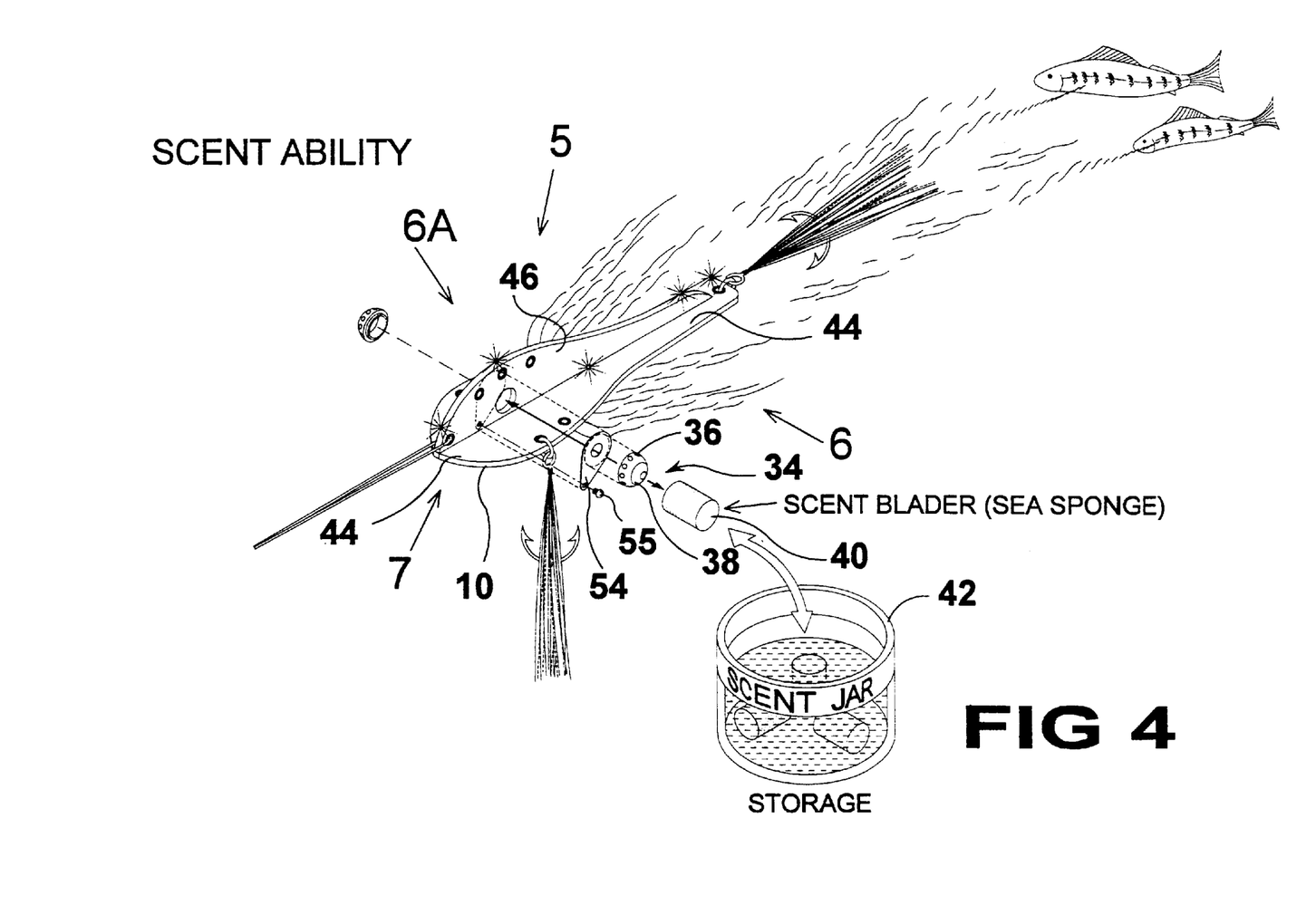

Turning to FIG. 4, therein is shown a perspective view illustrating the scent ability of the aluminator lure 10. The aluminator lure is equipped with a unique scent system generally shown at 34 which scent is emitted through a plurality of apertures 36 located in the laterally extending pair of eye-like structures 38 positioned on both sides of the fin 46. The scent plug 40 is a natural sea sponge feature which enables the lure 10 to be scented with different bait fish odors which assist in attracting fish to the lure 10. When in use, the scent is slowly released through tiny holes 36 located along the base of the eye-like structure 38. The plugs 40 are stored in a container 42 in order to keep the plugs fresh for future use. Also shown therein is the top surface 44 of the lure along with the upstanding raised fin portion 46.

Figure 5:
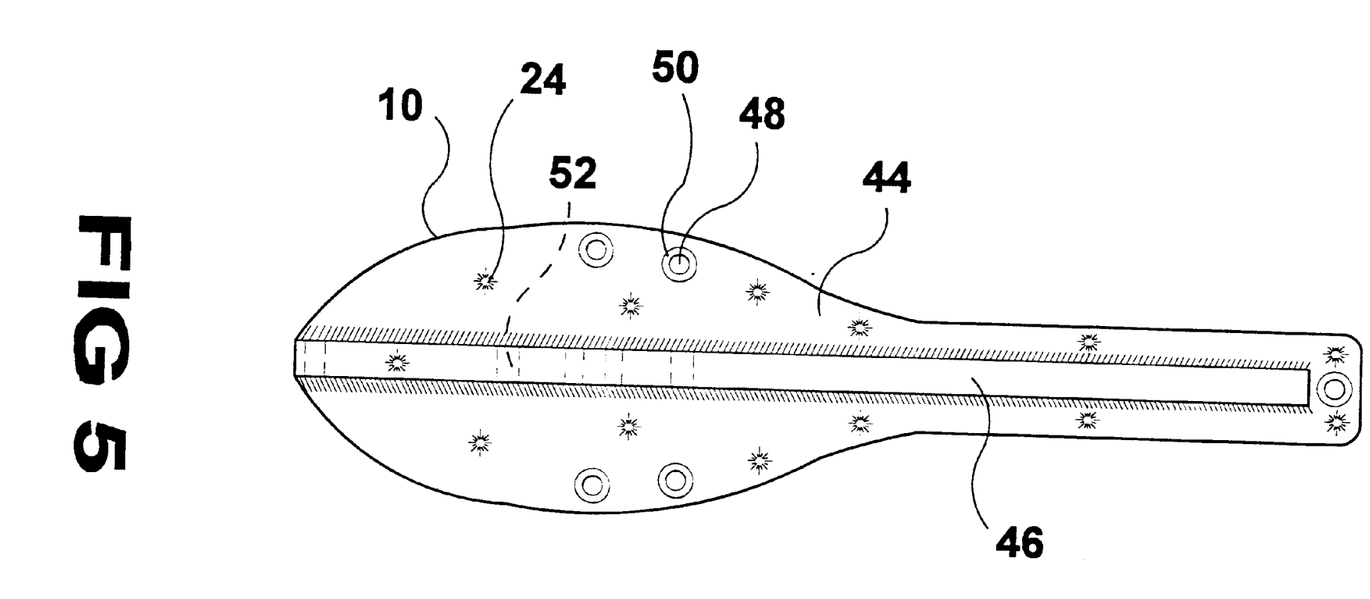
FIG. 5 is a top plan view of the present invention taken from FIG. 4 as indicated. Shown is a plurality of hook orifices having grommets installed therein and a plurality of tying ports shown in outline.

Turning to FIG. 5, therein is shown a top plan view of the present invention 10 taken from FIG. 4 as indicated. Shown therein is a plurality of hook orifices 48 having grommets 50 installed therein along with a plurality of tying ports 52 shown in outline. Also shown is the top surface of the lure 44 along with the upstanding raised fin surface 46. Reflectivity surfaces 24 are also shown. The five sides of the lure are formed by the two sides of fin 46, the two sides of the top 44, and the bottom 22 (not shown).

Figure 6:
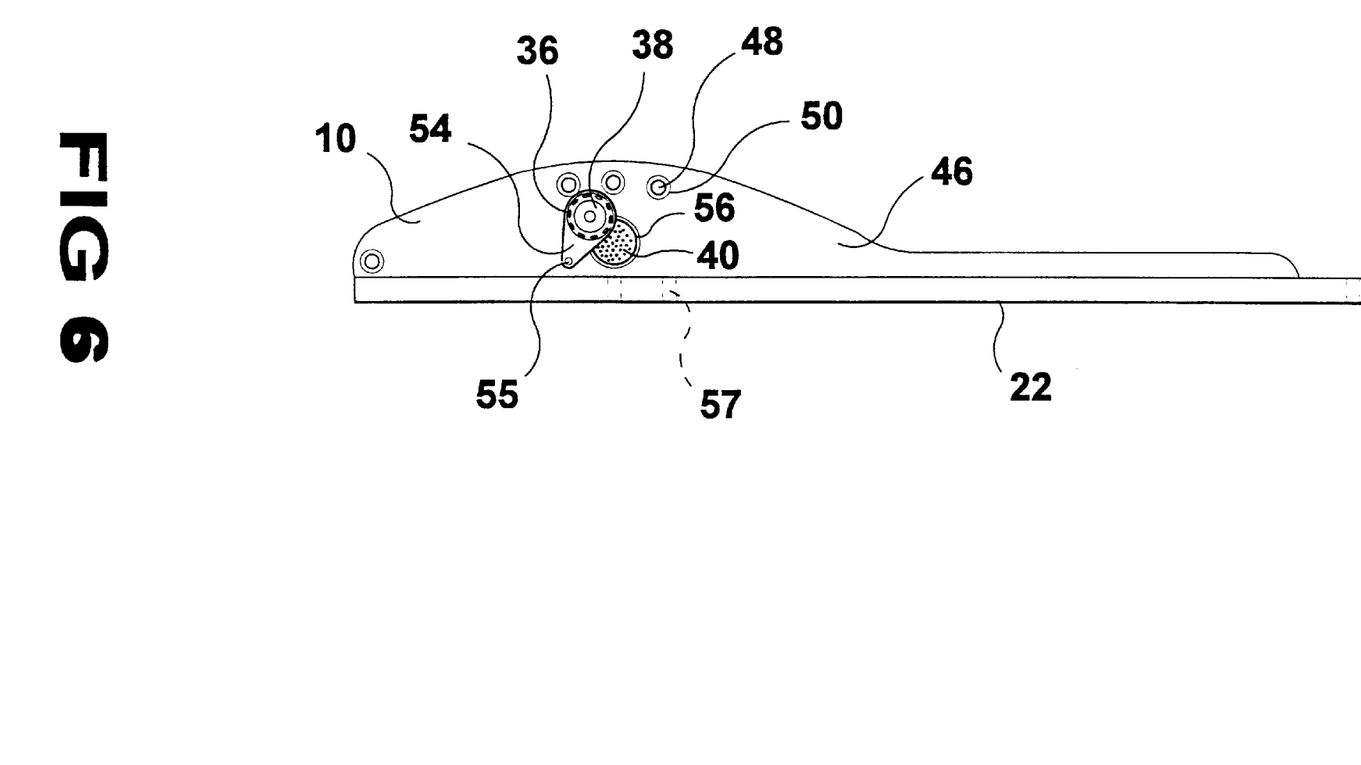

Turning to FIG. 6, therein is shown a side view of the present invention 10 taken from FIG. 4 as indicated. Shown therein is a plurality of tie port orifices 48 having grommets 50 formed thereabout having a plurality of hook ports 52 shown in outline. Also shown is the rotatable flap 54 with attachmnent means 55 by e.g., a screw, having an eye structure 38 attached therein along with the apertures 36. The flap 54 provides access to the receptacle 56 where a scent plug 40 can be placed. Also shown is the bottom of the lure 22 along with the raised fin 46.

Figure 6A:
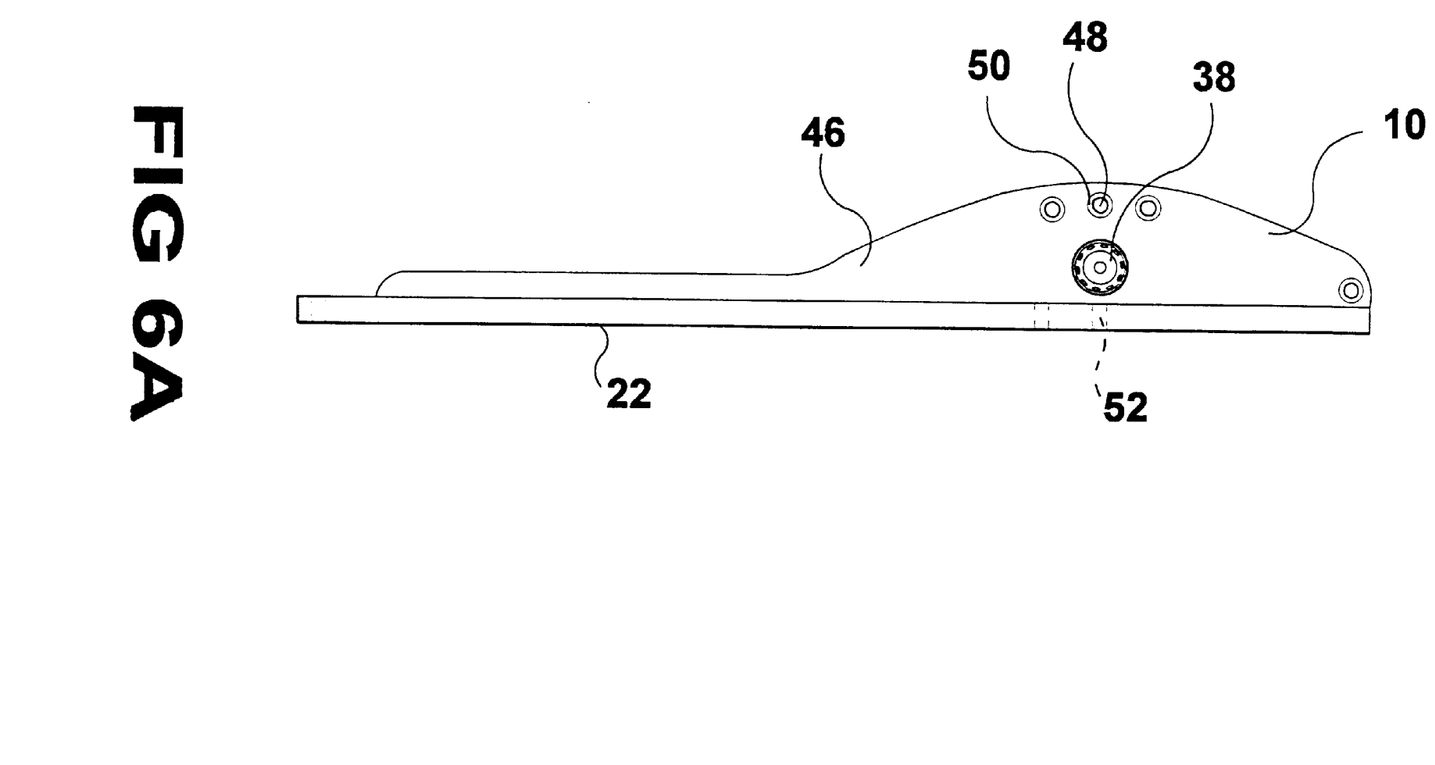
FIG. 6A is a side plan view of the present invention taken from FIG. 4 as indicated. Shown is a plurality of tie port orifices having grommets installed therein and a plurality of hook ports shown in outline.

Turning to FIG. 6A, therein is shown an opposite side view of the present invention taken from FIG. 4 as indicated. Shown is a plurality of tie port orifices 48 having grommets 50 installed therein and a plurality of hook ports 52 shown in outline. Also shown is the eye-like of the structure 38 along with the bottom of the lure 22 and the raised fin-like structure 46.

Figure 7:
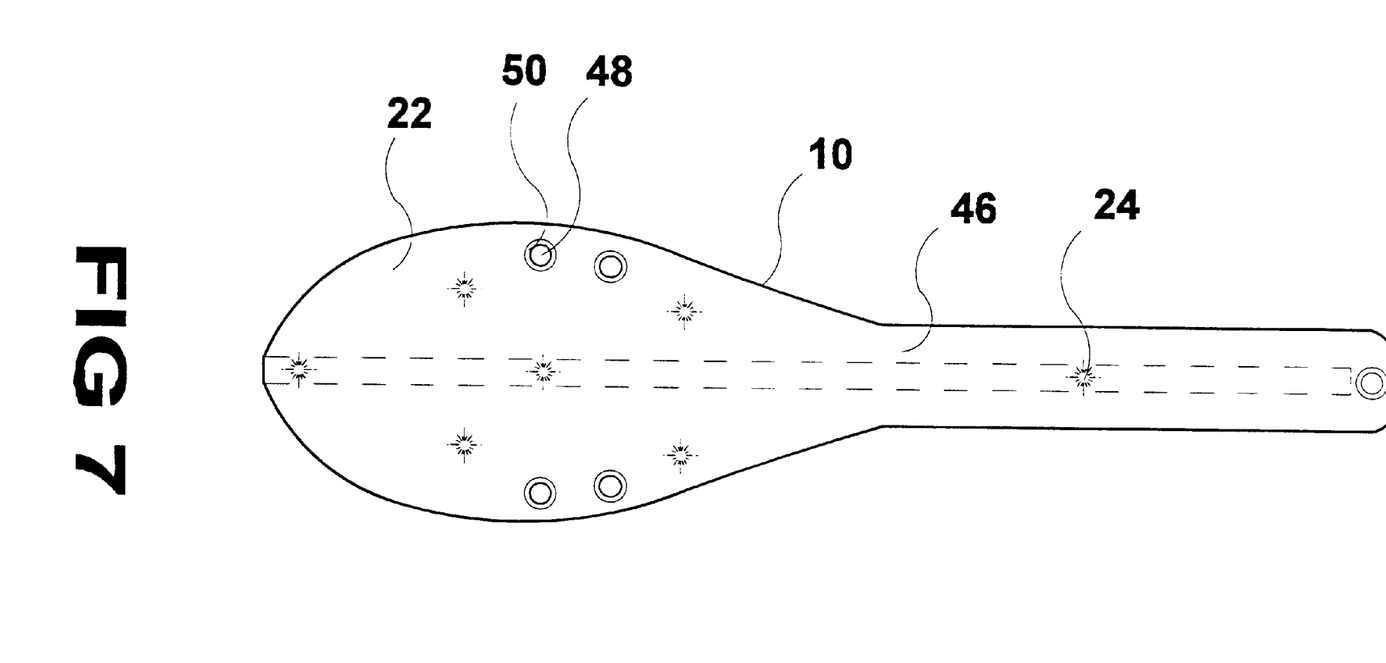
FIG. 7 is a bottom plan view of the present invention taken from FIG. 4 as indicated. Shown is a plurality of hook orifices having grommets installed therein.

Turning to FIG. 7, therein is shown a bottom view of tie present invention 10 taken from FIG. 4 as indicated. Shown therein is the bottom of the lure 22 having a plurality of hook or orifices 48 therein having grommets 50 installed therein. Also shown are the reflective surfaces 24 along with the raised fin 46 in outline.

Figure 8:
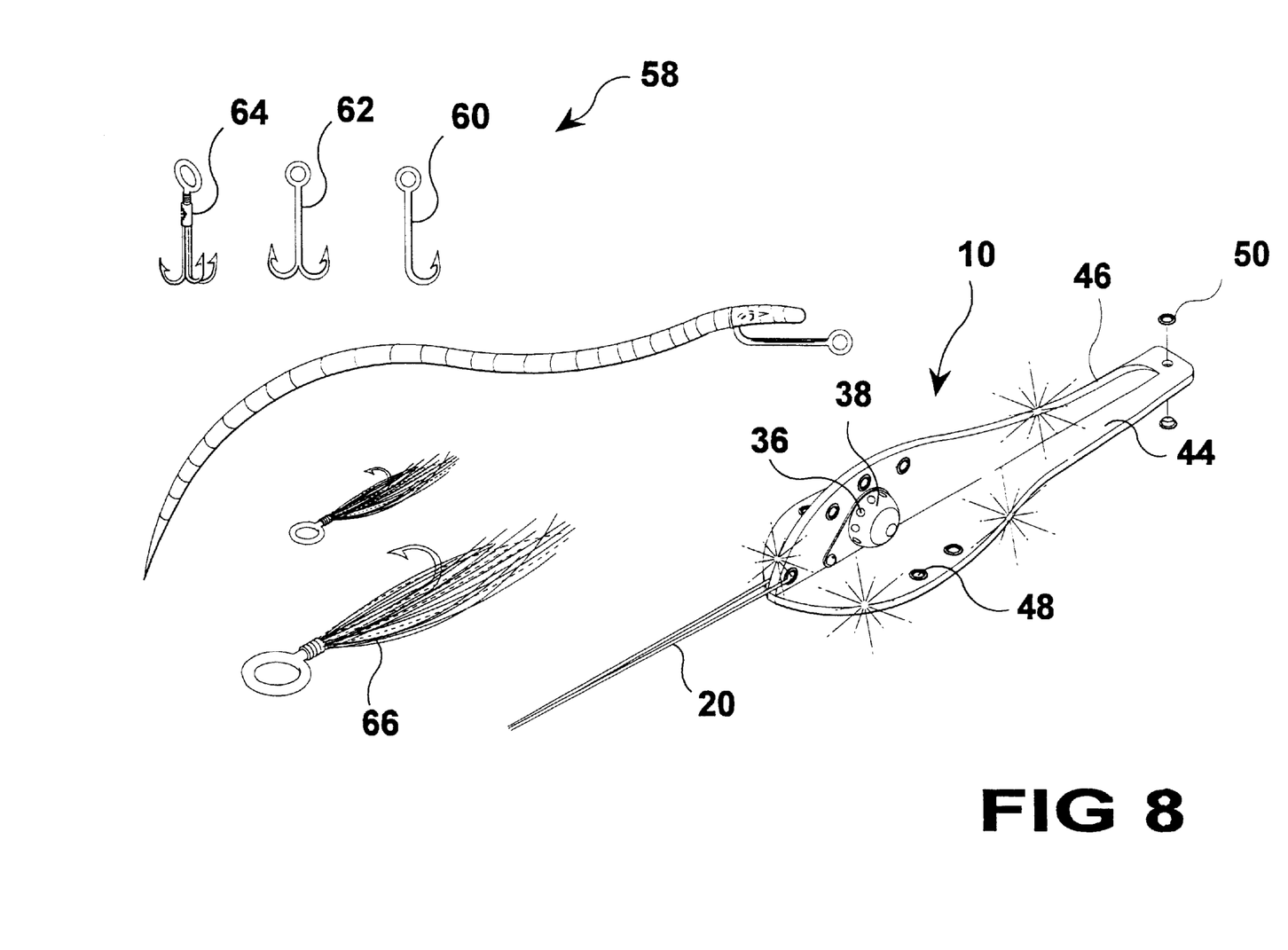
FIG. 8 is a perspective view of the present invention and its multi purpose hook system. The aluminator lure includes single, double and treble hooks combined with bucktail teaser hair in different colors to coincide with the type of fish targeted.

Turning to FIG. 8, therein is shown a perspective view of the present invention 10 and its multi-hook system generally shown at 58. The aluminator lure 10 includes single 60, double 62, and triple 64 hooks combined with bucktail teaser hair 66 in different colors which coincide with the types of fish which are being targeted by the fisherman. Also shown is the top surface 44 along with the raised fin 46 of the lure 11. Also shown are the hook orifices 48 along with the eye structure 38 and apertures 36 along with line 20 attached to the lure.

Figure 9:
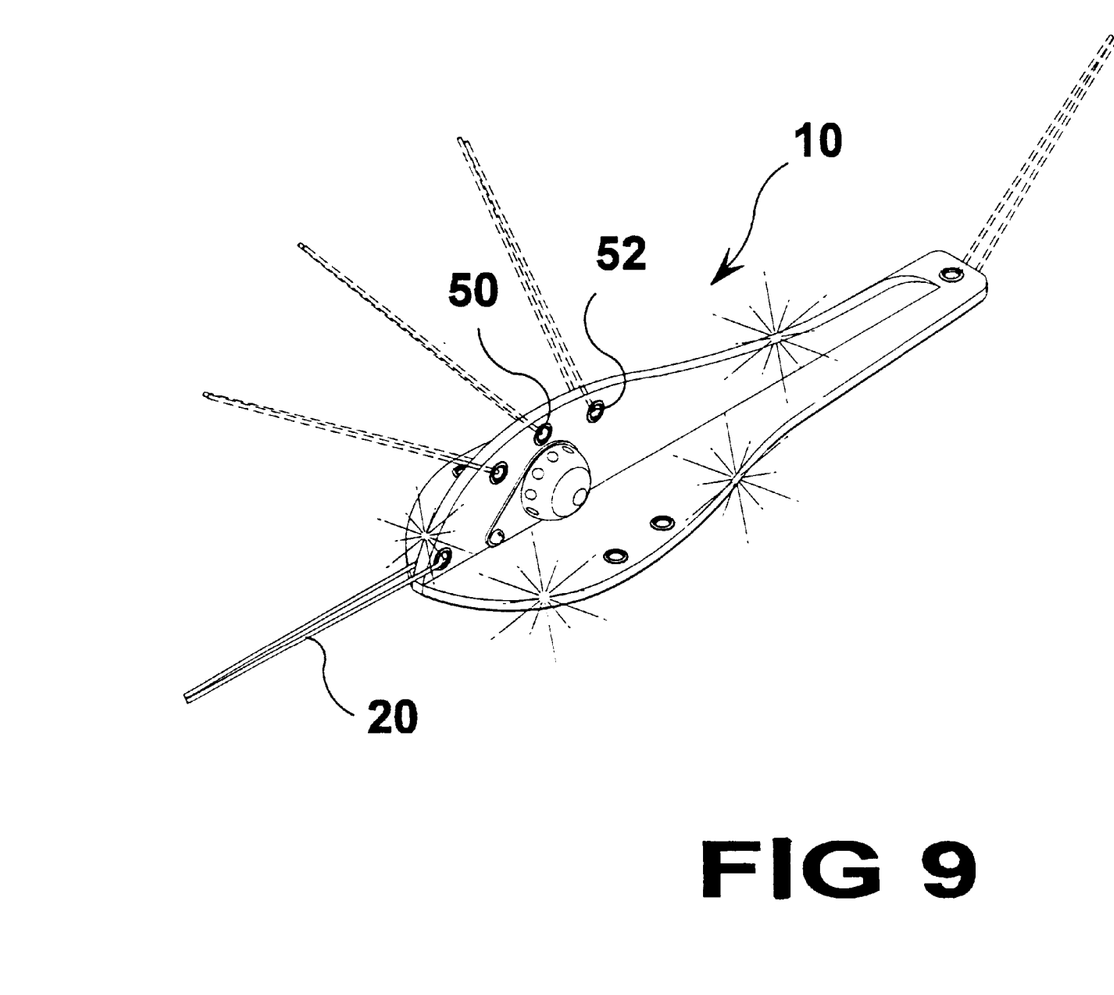

Turning to FIG. 9, therein is shown a perspective view of the present invention 10 and its multi-tie ports 52 and line 20. The location of the rigging or tying holes 52 enable the angler to troll, jig or surf cast. The lure is also capable of rising to the water surface and acting as a popping lure. It also has the ability to be reversed 180 degrees so as to act as a deepwater squid-like jig. All ports 52 are protected by grommets 50 to ensure smooth and safe line action, and less wear on the line and the lure.

What is claimed to be new and desired to be protected by Letters Patent is set forth in the claims:

1. An apparatus for a fishing lure having a fish hook for use on a fishing line, comprising:
    a) an elongated paddle shaped lower body, said lower body being substantially flat;
    b) said lower body having a broader portion oriented toward a front of the fishing lure;
    c) said lower body having a substantially flat bottom;
    d) said lower body having a substantially flat top;
    e) said lower body having an upright standing fin positioned intermdiately on said top perpendicular to said top, said fin traveling substantially the entire length of said lower body, said fin terminating just short of the rear end of said lower body;
    f) five surfaces located on said lower body and said fin;
    g) said lower body having multiple apertures therein, said fin having multiple apertures therein; and,
    h) said apertures of said fin receiving a fishing line, said apertures of said lower body receiving the fish hook, whereby said apparatus is useful for fishing, and said apparatus further comprises:
    i) a scent release system positioned on said fin, said scent released system including:
        i) a pair of eye-like structures, each of said eye-like structures being dome shaped and positioned on a respective side of said fin; and
        ii) a receptacle transversely positioned in said fin and communicating with both of said pair of eye-like structures.

2. The apparatus of claim 1, said fin having multiple transverse apertures therein for receiving a fishing line.

3. The apparatus of claim 2, said apertures having various locations on said fin, said locations causing the lure to travel at various angles in the water.

4. The apparatus of claim 3, said apertures located on the periphery of said fin for receiving a fishing line.

5. The apparatus of claim 2, said apertures further comprising grommets positioned therein.

6. The apparatus of claim 1, said lower body having multiple transverse apertures located in said flat portion of said lower body for receiving fish hooks.

7. The apparatus of claim 6, said apertures further comprising grommets positioned therein.

8. The apparatus of claim 7, said lower body having an aperture in the perifery of its tail, said aperture having a grommet positioned therein for receiving fishing line, said apparatus being reversable for use on a fishing line.

9. The apparatus of claim 6, said apertures located on the periphery of said flat portion of said lower body for receiving fish hooks.

10. The apparatus of claim 9, wherein said fish hook is a single hook.

11. The apparatus of claim 9, wherein said fish hook is a double hook.

12. The apparatus of claim 9, wherein said fish hook is a treble hook.

13. The apparatus of claim 1, said dome structure having multiple apertures about the periphery of its base, said apertures emitting scent from said receptacle, said receptacle having a source of scent contained interior of said receptacle.

14. The apparatus of claim 13, said receptacle further comprising means for access whereby said source of scent can be placed in said receptacle.

15. The apparatus of claim 14, said means for access further comprising an offset flange positioned about the base of said dome structure, said flange having a hole therein, said hole for receiving a means for attaching said dome structure to said fin.

16. The apparatus of claim 15, said means for attaching further comprising a screw.

* * * * *